United States Patent [19]
Cousino

[11] 3,977,523
[45] Aug. 31, 1976

[54] STORAGE CELL ASSEMBLY

[75] Inventor: Bernard A. Cousino, Fort Myers, Fla.

[73] Assignee: Cousino Corporation, Fort Myers, Fla.

[22] Filed: Feb. 28, 1975

[21] Appl. No.: 553,926

Related U.S. Application Data

[62] Division of Ser. No. 414,372, Nov. 9, 1973, Pat. No. 3,885,670.

[52] U.S. Cl. .................................. 206/387; 211/41; 211/89; 220/23.4
[51] Int. Cl.² ...................................... B65D 85/672
[58] Field of Search .............. 206/387, 73; 211/126, 211/89, 41; 220/23.4, 23.83, 23.86

[56] References Cited
UNITED STATES PATENTS

| | | | |
|---|---|---|---|
| 2,458,699 | 1/1949 | Ginsberg | 211/41 UX |
| 3,045,816 | 7/1962 | King | 206/73 |
| 3,187,890 | 6/1965 | Brown | 206/73 |
| 3,353,736 | 11/1967 | Bauer | 206/73 |
| 3,407,938 | 10/1968 | Walter et al. | 211/41 |
| 3,547,274 | 12/1970 | Sosinkski | 211/89 |
| 3,599,828 | 8/1971 | Conway | 220/23.4 |
| 3,603,478 | 9/1971 | Connan | 206/387 |
| 3,635,350 | 1/1972 | Wolf | 220/23.4 |
| 3,746,180 | 7/1973 | Spiroch et al. | 211/41 R |
| 3,874,507 | 4/1975 | Lanahan | 206/73 |
| 3,909,088 | 9/1975 | Dennehey et al. | 211/41 |

*Primary Examiner*—George E. Lowrance
*Assistant Examiner*—Bruce H. Bernstein
*Attorney, Agent, or Firm*—Richard D. Emch

[57] ABSTRACT

The disclosure relates to a storage cell assembly for magnetic tape cartridges. Modular storage cells are joined into a storage cell assembly that can accommodate a plurality of cartridges in either a linear or circular array. The storage cell assembly provides rapid retrieval of audio signals, such as recorded music, computer data and announcements. Each storage cell case is three-sided, having a panel and integral opposed sidewalls. A flexible release finger extends downwardly from one sidewall to the level of the other sidewall. An end cover panel is positioned adjacent the last one of the individual storage cells and aligned retaining flanges on the sidewalls and the edges of the end cover panel define guide recesses. Retainer members are positioned in the guide recesses to hold the components in an assembled relationship. In one embodiment, a locking member is positioned adjacent the retainer member and cemented therewith to provide a unitary storage cell assembly.

8 Claims, 16 Drawing Figures

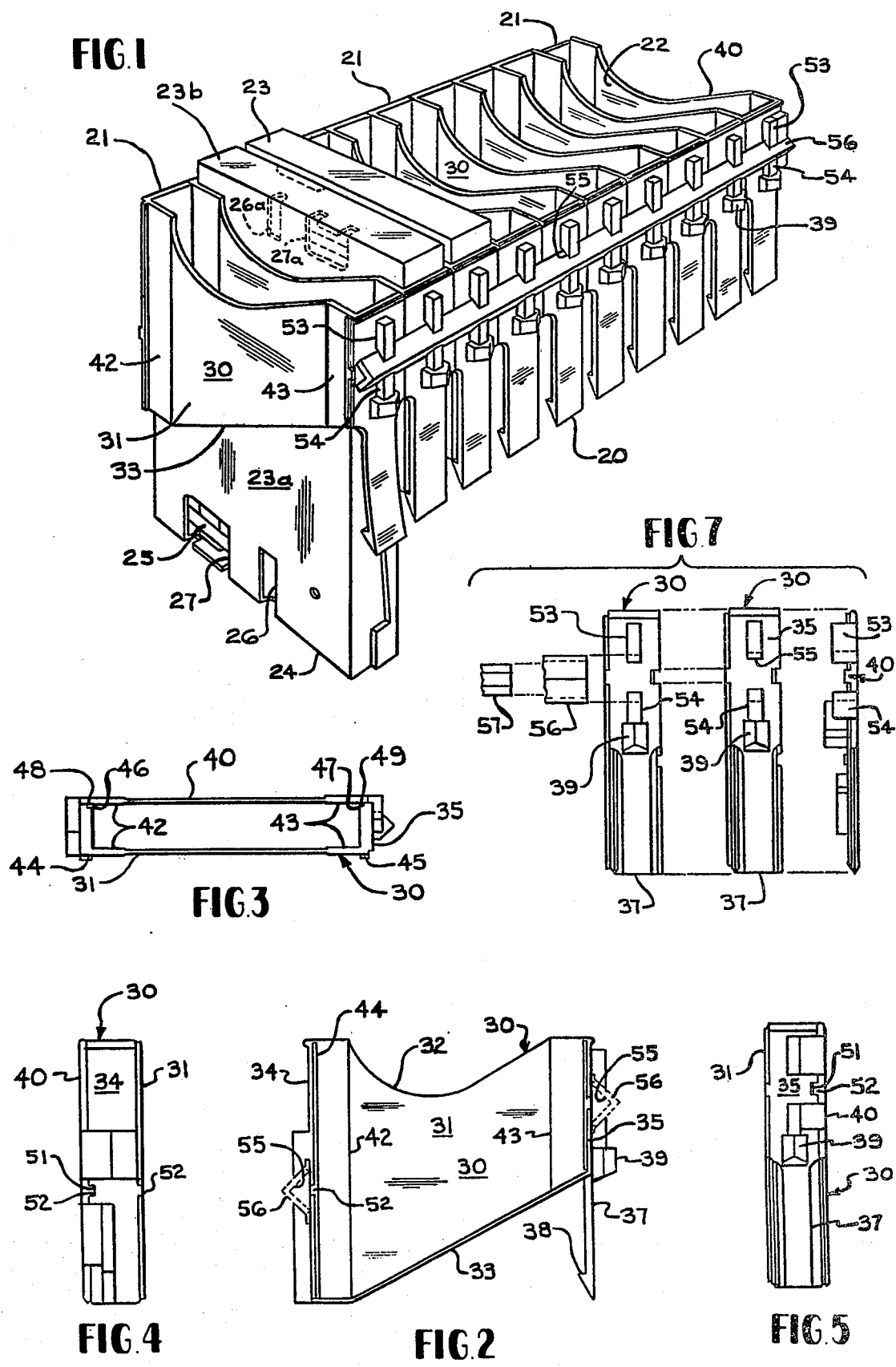

STORAGE CELL ASSEMBLY

This is a division of application Ser. No. 414,372 filed Nov. 9, 1973, now U.S. Pat. No. 3,885,670.

BACKGROUND OF THE INVENTION

In the field of audio communications, utilizing magnetic tape, the present state of the art is limited in flexibility. This excludes magnetic tape from many applications that require rapid retrieval or random access to specific tape increments of recorded materials. Some of these applications are as follows: "jukebox" music; certain types of computer data; storage banks of educational units of study; broadcast spot announcements; random access to recorded musical selections stored, for example, in automobile trunks; emergency or sales promotion announcements in public buildings; and airport flight announcements, which may be multi-lingual recordings.

All of the above presently excluded applications and many more may be made practical or improved by the present invention.

Most magnetic tapes in the audio communications field are of the reel-to-reel type. Accordingly, considerable time is required to wind or rewind such tapes to position the tape at a given recorded message. This curtails the utilization of such reel-to-reel tapes for quick retrieval. Furthermore, the cost of complex handling equipment has been prohibitive.

SUMMARY OF THE INVENTION

The present invention relates to a low-cost, modular "building-block" approach to the assembly of a plurality of storage cells. The storage cell assembly, according to the present invention, provides rapid retrieval of recorded music, computer data and announcements from tape cartridges which are positioned within the storage cell assembly.

Endless loop tape cartridges and reel-to-reel tape cassette units are well known in the art, and are not the subject matter of the present invention. Prior art endless loop tape cartridges, whether standard 8-track size cartridges such as used in automobile players or miniaturized tape loop cartridges, normally consist of a housing having a rotatable disk mounted therein. The tape coil forms a continuous loop and is guided across openings adjacent one end of the cartridge. Normally one opening receives the tape player drive capstan while the other opening directs the tape across the magnetic head of the operating mechanism.

The present invention comprises a plurality of storage cells that can accommodate any number of cartridges in a linear or a circular assembly. Such an assembly permits random access or automatic sequential playing or recording of the tape cartridges. The assembly may consist of a case and a cover joined to form a single unit, or a series of components assembled into a rectilinear or into a circular configuration. In the formation of a rectilinear, multiple cell storage clip assembly, each cartridge storage case includes a panel having integral sidewalls extending therefrom in an opposed relationship. A flexible release finger extends downwardly from one of the sidewalls to the level of the bottom of the other sidewall. An end cover is positioned in opposed relationship to the last storage cell case to complete the storage cell assembly. Means are provided on the two sidewalls and on the end or cover panel for retaining the components in an accurately indexed and assembled relationship. The individual units are cemented or otherwise connected to form a unitary assembly.

In the formation of a storage cell assembly in a unitary circular configuration, each storage "case" is joined with a storage "cover". In this embodiment, the cover is provided with a mounting arm or flange. The resulting single storage cell assembly is then mounted and fixed to the outer periphery of spaced disks to form the circular storage cell assembly. Such an assembly may include any desired number of individual storage cell assemblies. Individual continuous loop cartridges are positioned within the individual storage cells. Miniature continuous loop cartridges now provide a broadcast quality which is very good. This is achieved on narrow tapes at relatively slow speeds.

The present invention permits broad utilization of short recorded increments in a small space for immediate random access and instant replay. All of this may be done by using relatively simple handling mechanisms.

By way of an example, two ten-cell storage cell assemblies, according to the present invention, can be mounted in tandem. A push button logic control alternates playback of a continuous loop cartridge in each unit. While unit one is playing, unit two is shifting to a specific tape cartridge for instantaneous follow up once the stop signal from unit one is received. Furthermore, upon completion, the unit one recording loop is already at its "start" position and ready for the next signal which it receives, without a complicated "rewind" procedure.

BRIEF DESCRIPTION OF THE DRAWINGS

FIG. 1 is a perspective view of a rectilinear cartridge storage cell assembly, according to the present invention, with several tape cartridges being inserted therein and illustrating the flexibility of operational positions;

FIG. 2 is an elevational view of a storage cell case and cover, according to the present invention;

FIG. 3 is a top view of the storage case and cover shown in FIG. 2;

FIG. 4 is an end view of the left-hand end of the unit shown in FIGS. 2 and 3;

FIG. 5 is an end view of the right-hand end of the unit shown in FIGS. 2 and 3;

FIG. 7 is a view similar to FIG. 6, showing the assembly operation as viewed from the right-hand side of FIG. 6;

DESCRIPTION OF THE PREFERRED EMBODIMENTS

Figure 6:
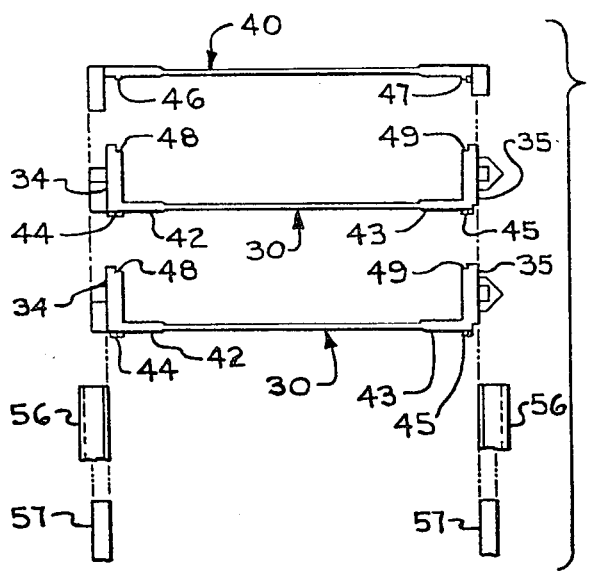
FIG. 6 is a diagrammatic top view of the storage cell assembly shown in FIG. 1, being assembled.
Figure 8:
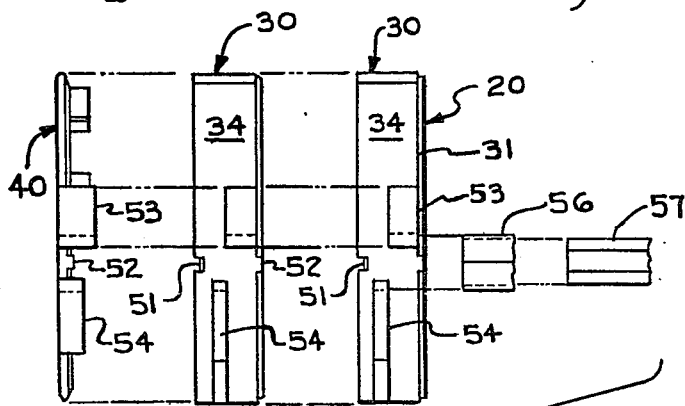
FIG. 8 is a view similar to FIG. 6, showing the assembly operation as viewed from the left-hand side of FIG. 6.

A storage cell assembly is generally indicated by the reference number 20 in FIG. 1. The storage cell assembly 20, in this embodiment, includes a plurality of ten storage cells 21 which are aligned in a linear relationship. The storage cells 21 define storage cavities 22, each of which receives a tape cartridge 23. Each of the tape cartridges 23, which are known in the prior art, includes a rectangular housing 24 which mounts an endless magnetic tape 25 on a rotatable disk (not shown). Openings 26 and 27 are provided to receive a tape player drive capstan and a tape player magnetic head, respectively. The cartridge 23 is stored in the proper direction to accommodate the operating mechanism, as shown in FIG. 1.

A tape cartridge 23a has been released from the storage cell assembly 20 and moved into an operating position relative to the operating apparatus (not shown). However, with other types of tape handling apparatus, the cartridges 23 are moved upwardly into position. Normally, in this alternative situation, the tape cartridges 23 would be reversed such that the openings 26 and 27 will be adjacent the upper portions of the storage cell assembly 20 as indicated by dashed lines 26a and 27a in FIG. 1, with respect to the cartridge 23b.

Referring to FIGS. 2–5, an individual storage cell case is generally indicated by the reference number 30. The storage cell 30 includes a wall panel 31 having a top loading recess 32 defined in its upper surface and a bottom loading recess 33. A first integral sidewall 34 extends perpendicularly from the wall panel 31 and a second integral sidewall 35 extends perpendicularly from the opposite side of the wall panel 31. As shown in FIG. 2, the first sidewall 34 is substantially longer than the second sidewall 35. A flexible release finger 37 having a retainer ledge 38 on its inner surface, extends downwardly from the second sidewall 35. The tape cartridges 23 are retained on the ledges 38 until mechanism (not shown) drops or lifts the cartridges 23, for examples the cartridges 23a and 23b shown in FIG. 1, into position.

An integral drive gear 39 is positioned on the second sidewall 35. The drive gears 39 mate with drive mechanism (not shown) which indexes the storage cell assembly 20 such that the desired tape cartridge 23 is positioned in a correct position relative to the tape operating mechanism.

An end wall or cover panel 40 is positioned adjacent the first and second sidewalls 34 and 35 in opposed relationship to the wall panel 31. Referring to FIG. 1, a plurality of individual three-sided storage cases 30 utilize only one wall panel 40 to complete the ten unit storage cell assembly 20. Each of the storage cases 30 includes on its exterior surface a pair of vertically extending and spaced apart clearing lands 42 and 43. Each of the wall panels 31 also defines a pair of spaced, vertically extending ridges 44 and 45 adjacent its side edges. The wall panel 40 includes similar ridges 46 and 47. The first sidewall 34 defines a vertically extending guide recess 48 on its outer edge and similarly, the second sidewall 35 defines a vertically extending guide recess 49 on its outer edge. Referring to FIG. 6, when the individual storage cases 30 are placed in adjacent relationship, as shown in FIG. 1, the guide recesses 48 and 49 mate with the ridges 44 and 45 of the next adjacent case 30, while the guide recesses 48 and 49 of the last case 30 mates with the ridges 46 and 47 on the cover panel 40. Referring to FIG. 5, in the present embodiment, the sidewalls 34 and 35 also define notches 51 which mate with projections 52 defined on the outer surface of the wall panel 31 and on the end cover panel 40.

Retaining means are provided to hold the individual storage cases 30 and the end cover panel 40 in the rectilinear alignment shown in FIG. 1. In the present embodiment, the retaining means includes upper and lower retaining flanges 53 and 54 on the outer sides of the first and second sidewalls 34 and 35 and on the side edges of the end cover panel 40. The retaining flanges 53 and 54 define therebetween aligned retainer grooves 55. Referring to FIGS. 1, 6, 7, 8 and 9, a longitudinally extending retaining member or angle 56 is inserted in the aligned retainer grooves 55. In the preferred embodiment, a flexible wedge member 57 is inserted and cemented adjacent the angle 56. This forms a unitary linear storage clip or assembly 30.

Referring to FIGS. 10–13, the retaining member 56 may have numerous configurations. The FIG. 10 embodiment shows a retainer member 60 having an outwardly extending projection 61 which is received by a tracking pulley 62 which is mounted on a shaft 63.

Figure 11:
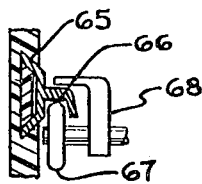

FIG. 11 shows another embodiment wherein a retaining member 65 has a guide shoulder 66 which receives a horizontal tracking wheel 67. The tracking wheel 67 is mounted for rotation on a support member 68.

Figure 12:
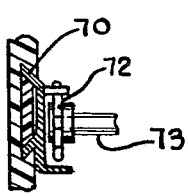
Figure 13:
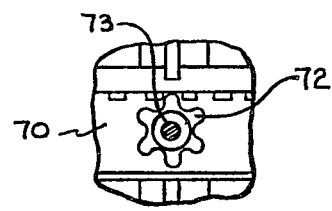
FIG. 13 is an elevational view taken at a position 90° removed from the FIG. 12 embodiment.

FIGS. 12 and 13 disclose another embodiment in which a retaining member 70 guides a gear 72. The gear 72 is mounted on and is driven by a horizontal drive shaft 73. The gear 72 both supports and drives the storage cell assembly 30.

Figure 9:
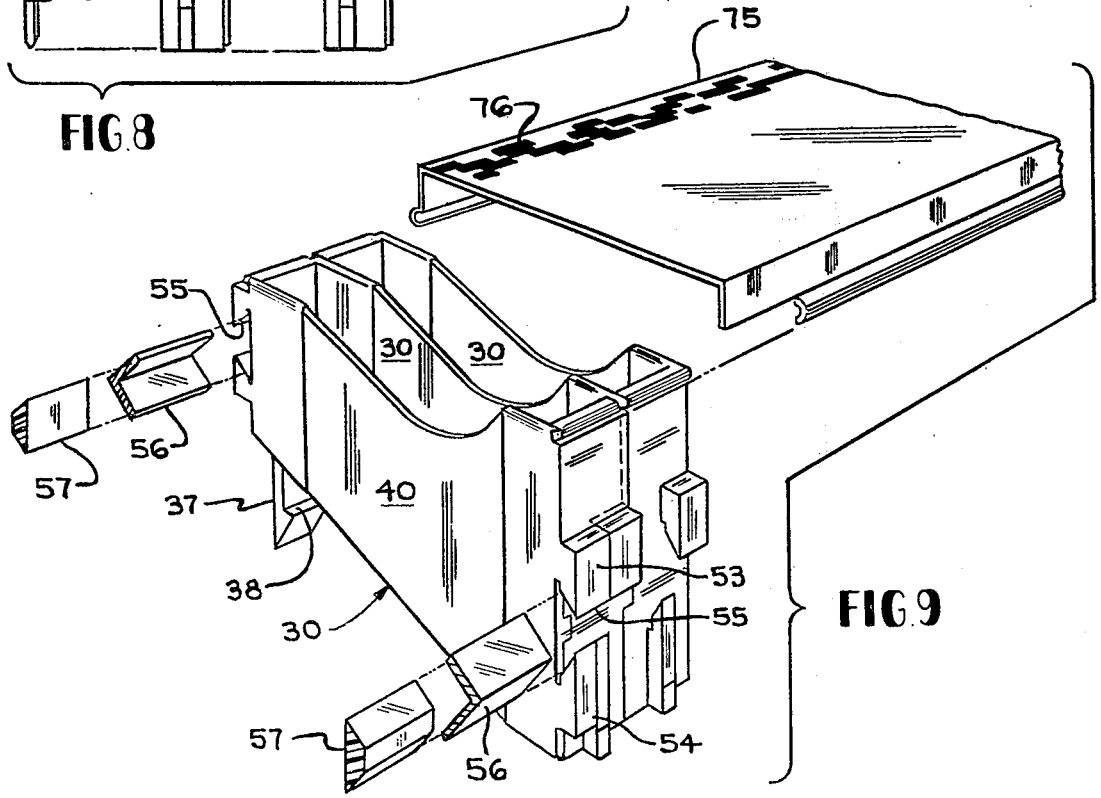
FIG. 9 is a reverse view of the linear cartridge storage cell assembly shown in FIG. 1 and showing a cover.
Figure 10:
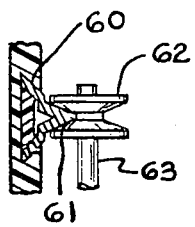
FIGS. 10–12 are embodiments of support and drive assemblies which may be utilized in connection with the rectilinear embodiment shown in FIG. 1.

Referring to FIG. 9, if desired a top cover 75 may be snapped over a storage assembly 30. In this embodiment, an electronic control mechanism scans indicia 76 to place a tape cartridge carried by an individual one of the storage cells in a predetermined position relative to the operating mechanism.

Figure 14:
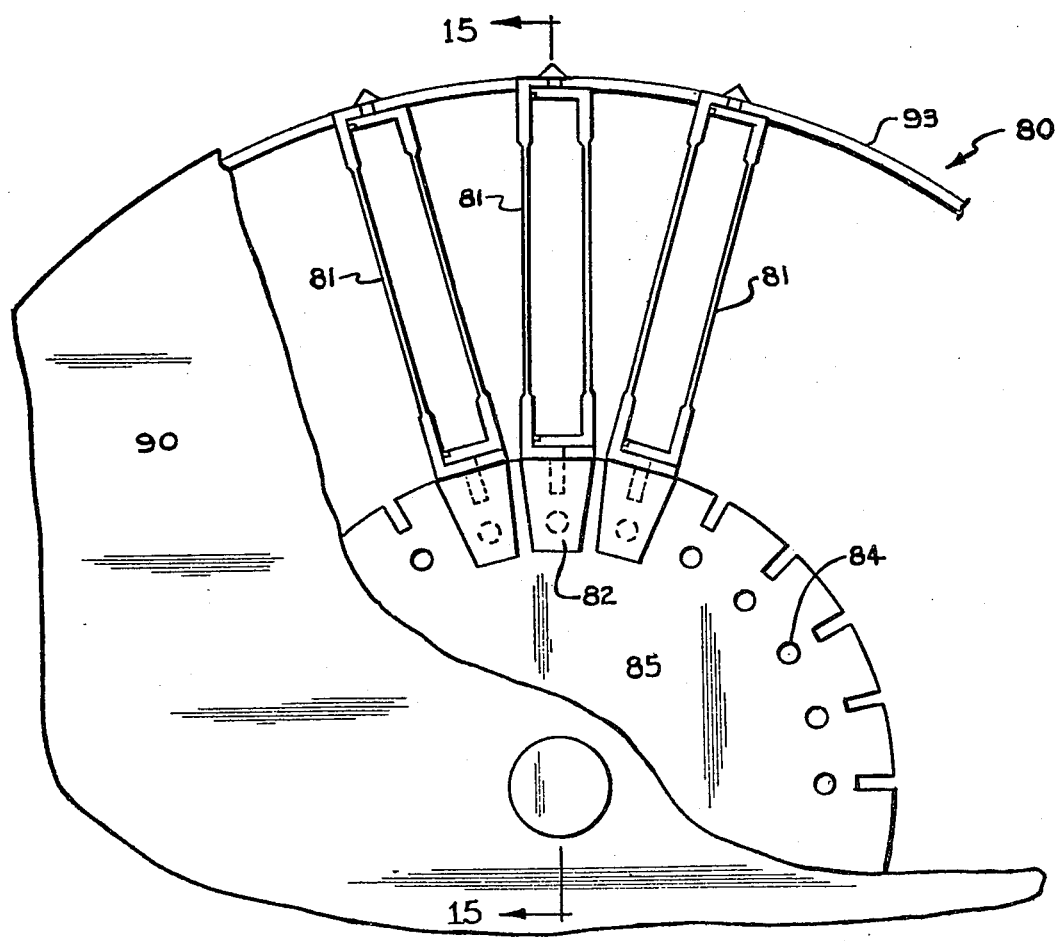
FIG. 14 is another embodiment of the present invention, showing a circular storage cell assembly.
Figure 15:
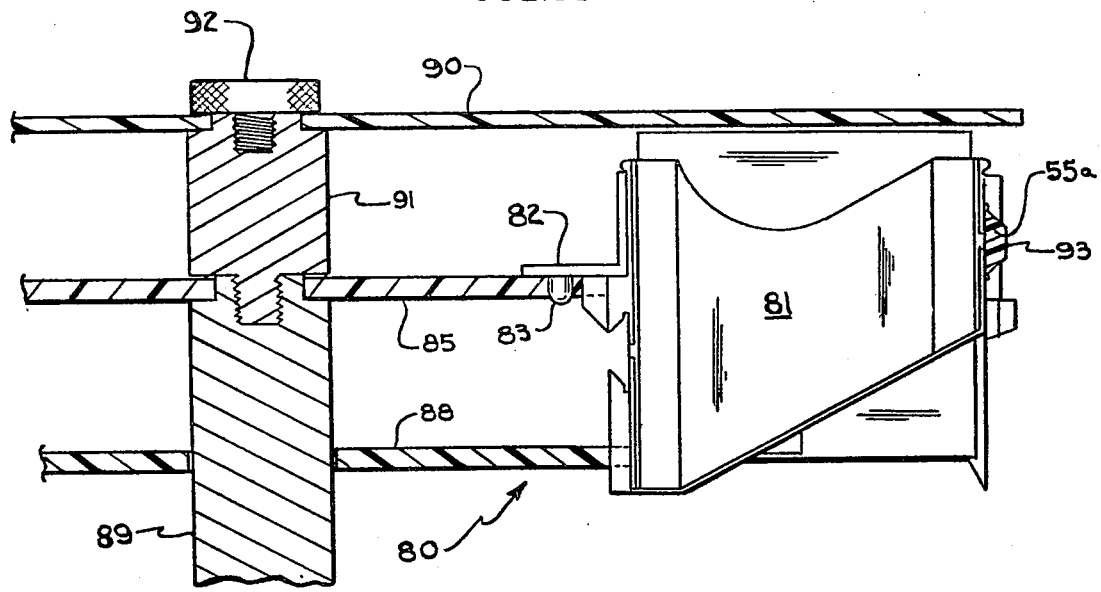
FIG. 15 is a fragmentary, cross-sectional view taken along the line 15—15 of FIG. 14.
Figure 16:
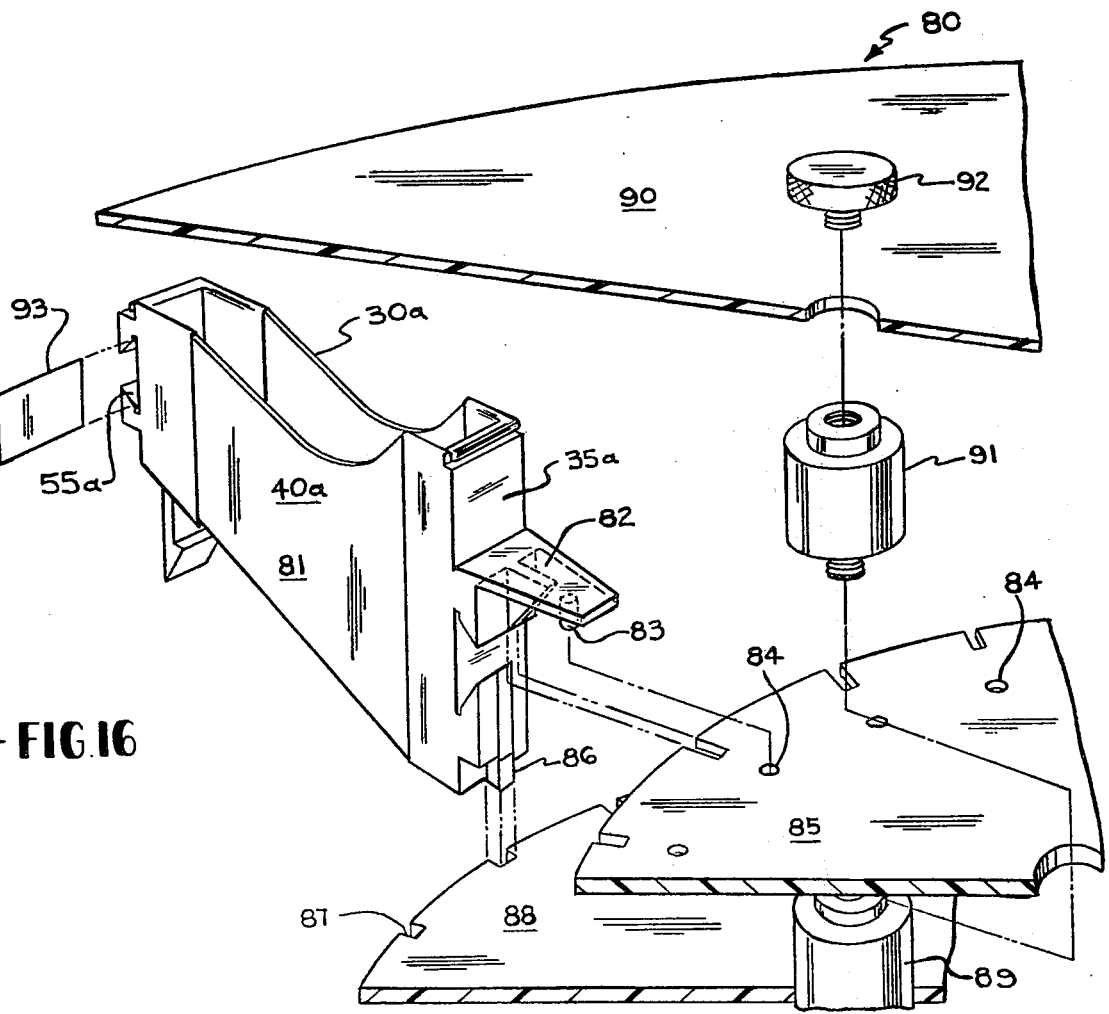
FIG. 16 is an exploded view of the embodiment shown in FIGS. 14 and 15.

Referring to FIGS. 14–16, another embodiment of a storage cell assembly, according to the present invention, is generally indicated by the reference number 80. The storage drum or assembly 80 includes a plurality of individual storage cells 81. Each of the storage cells 81 includes a three-sided storage cell case 30a and a cover panel 40a, which are joined together to form the unitary storage assembly 81. The storage cell assemblies 81 are very similar in construction to the individual linear assemblies shown in FIGS. 2–5, however, the storage cell assembly 81 includes a mounting arm 82 extending outwardly from the second sidewall 35a. A depending pin 83 is positioned on the underside of the mounting arm 82 and mates with holes 84 defined in a disk 85. The storage cell assembly 81 also includes a drive rib 86 which mates with peripheral slots 87 defined in a lower disk 88. A central shaft 89 interconnects the upper and lower disks 85 and 88. Referring to FIGS. 15 and 16, in the present embodiment, a circular cover 90 is positioned over the plurality of storage cell assemblies 81. The cover 90 is supported by a post 91 which is threadably engaged with the central shaft 89. A thumb screw 92 connects the cover 90 with the post 91. In this circular embodiment, a flexible retainer member 93 is positioned within the grooves 55a to secure the outer edges of the storage assemblies 81 in their proper spaced relationship. The flexible strip 93 may be cemented within the grooves 55a to form a unitary structure. However, in other embodiments, a friction fit is relied upon to enable the user to remove and replace individual ones of the storage cell assemblies 81.

What I claim is:

1. A cartridge storage cell assembly comprising, in combination, a storage case including a panel having a top loading recess defined adjacent its upper end and a bottom loading recess defined adjacent its lower edge, first and second sidewalls integrally attached to said panel, said first sidewall being longer than said second sidewall, a flexible release finger extending downwardly from said second sidewall, an end cover panel positioned adjacent said first and second sidewalls in opposed relationship to said panel, and means on said first and second sidewalls and said end cover panel for retaining the components in an assembled relationship, said retaining means comprising aligned retainer flanges extending outwardly from said first and second sidewalls and said end panel, said aligned retainer flanges defining retainer grooves for receiving a retainer member.

2. A cartridge storage cell assembly, according to claim 1 wherein said flexible release finger extends downwardly to the level of the bottom of said first sidewall.

3. A cartridge storage cell assembly, according to claim 1 wherein said flexible release finger has a retainer ledge defined on its inner surface.

4. A cartridge storage cell assembly comprising, in combination, a storage case including a panel having a top loading recess defined adjacent its upper end and a bottom loading recess defined adjacent its lower edge, first and second sidewalls integrally attached to said panel, said first sidewall being longer than said second sidewall, a flexible release finger extending downwardly from said second sidewall, an end cover panel positioned adjacent said first and second sidewalls in opposed relationship to said panel, and wherein the outer edges of said first and second sidewalls define vertically extending guide recesses and a pair of spaced, vertically extending ridges adjacent the side edges of said end panel, each of said ridges mating with a respective one of said guide recesses for retaining the components in an assembled relationship.

5. A cartridge storage cell assembly comprising, in combination, a storage case including a panel having a top loading recess defined adjacent its upper end, first and second sidewalls integrally attached in opposed relationship to said panel, an end cover panel positioned adjacent said first and second sidewalls in opposed relationship to said panel, release means on one of said sidewalls for releasing a cartridge position in the assembly and wherein the outer edges of said first and second sidewalls define vertically extending guide recesses and a pair of spaced, vertically extending ridges adjacent the side edges of said end panel, each of said ridges mating with a respective one of said guide recesses for retaining the components in an assembled relationship.

6. A cartridge storage cell assembly comprising, in combination, a storage case including a panel having a top loading recess defined adjacent its upper end and a bottom loading recess defined adjacent its lower edge, first and second sidewalls integrally attached to said panel, said first sidewall being longer than said second sidewall, an end cover panel positioned adjacent said first and second sidewalls in opposed relationship to said panel, and means on said first and second sidewalls and said end cover panel for retaining the components in an assembled relationship, said retaining means comprising aligned retainer flanges extending outwardly from at least one of said first and second sidewalls, said aligned retainer flanges defining retainer grooves for receiving a retainer member.

7. A cartridge storage cell assembly, according to claim 6, including a circular member positioned adjacent one of said sidewalls, cooperating means on said circular member for holding said storage case and said circular member in an assembled relationship.

8. A cartridge storage cell assembly, according to claim 6 including an integral drive gear positioned on the exterior surface of said second sidewall.

* * * * *